United States Patent

Haydu

[11] 3,737,012
[45] June 5, 1973

[54] SLACK ADJUSTER FOR RAILWAY BRAKE APPARATUS

[75] Inventor: Andrew G. Haydu, Pittsburgh, Pa.

[73] Assignee: Westinghouse Air Brake Company, Wilmerding, Pa.

[22] Filed: Mar. 1, 1972

[21] Appl. No.: 230,581

[52] U.S. Cl. ............................ 188/202, 188/196 D
[51] Int. Cl. ............................................ F16d 65/56
[58] Field of Search ............... 188/52, 196 D, 196 BA, 188/202, 203

[56] References Cited

UNITED STATES PATENTS

| 3,406,791 | 10/1968 | Williams | 188/52 |
| 3,499,507 | 3/1970 | Scott et al. | 188/52 |

Primary Examiner—Duane A. Reger
Attorney—Ralph W. McIntire, Jr. and Wallace F. Poore

[57] ABSTRACT

This invention relates to a railway car truck braking rigging including two brake beams one of which carries a brake cylinder device the piston rod of which is so connected by a lever and a link to both brake beams that, upon effecting a brake application, the brake shoes carried by these beams are pressed against the tread surface of the wheels. A slack adjuster mechanism comprises a non-rotatable member that has the lever pivotally mounted thereon adjacent one end thereof. An external non-self-locking screw thread on this member carries a similarly threaded nut, this member being longitudinally movably mounted relative to one of the brake beams. One end of the nut constitutes a clutch face that is normally spring-biased against a stationary clutch face formed on a slack adjuster housing to prevent rotation of the nut and longitudinal movement of the screw member. The slack adjuster mechanism further comprises a clutch dog disposed about the link and normally locked thereto. Means are provided for rocking the dog out of locking engagement with this link upon the occurrence of shoe wear during a brake application after which the link is moved relative to the dog. Upon effecting a release the dog is relocked to the link and thereafter its movement is transmitted via a pivoted lever to the nut to disengage the clutch. The nut is then spun on the non-rotatable member to effect longitudinal movement of this member which is effective to adjust the lever, link and piston rod relative to the brake beams to maintain constant brake shoe clearance.

12 Claims, 4 Drawing Figures

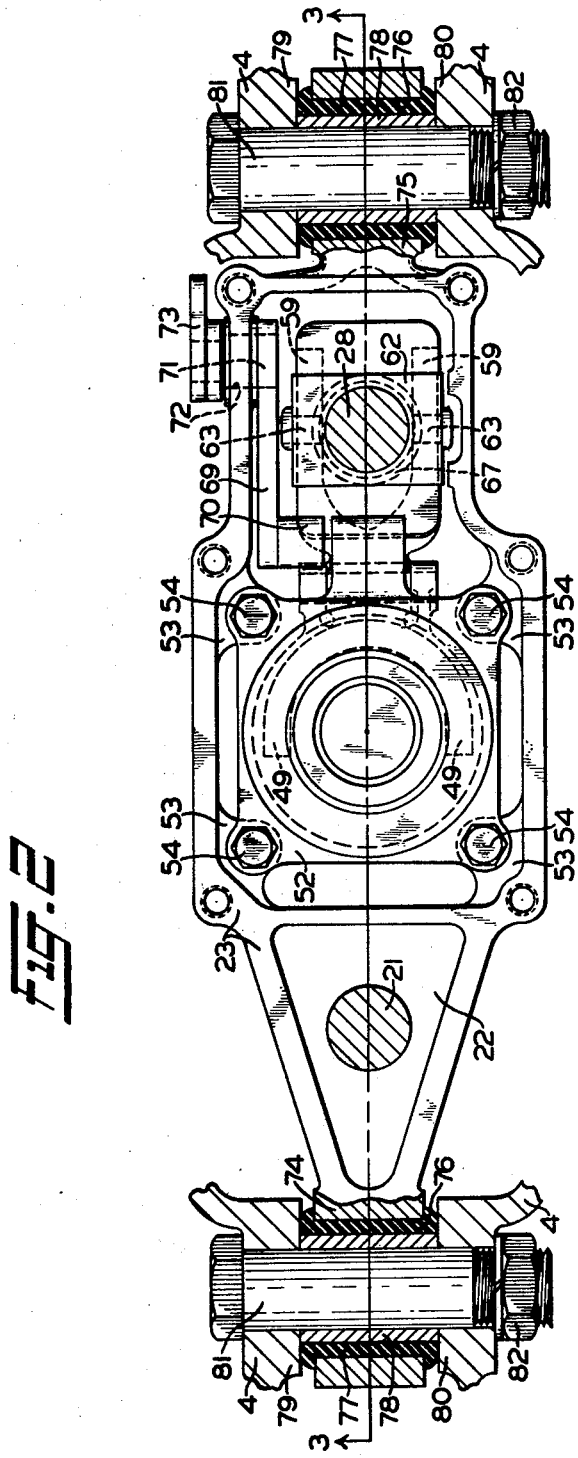

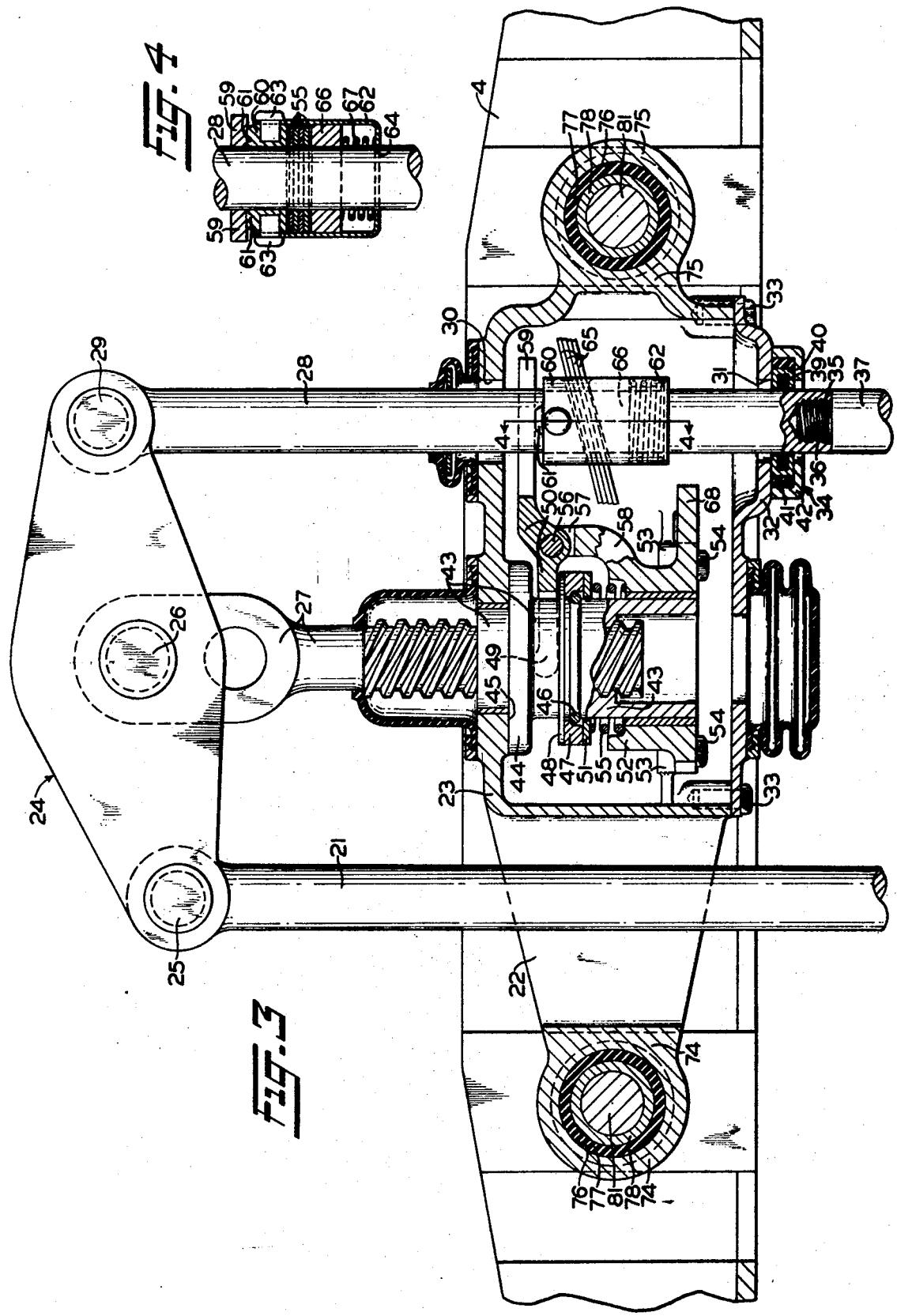

SLACK ADJUSTER FOR RAILWAY BRAKE APPARATUS

BACKGROUND OF THE INVENTION

When composition type brake shoes are used with brake rigging that comprises two brake beams one of which carries a brake cylinder device, the piston rod of which is operatively connected to one end of a force equalizing lever that is pivotally mounted midway its ends on the other brake beam and has its other end pivotally connected to one end of a link the opposite end of which is connected to the one brake beam, and this brake rigging is installed on heavyweight railway cars, a brake cylinder of large diameter and therefore of increased weight is necessary to provide the required braking force for adequately braking these cars. The brake cylinder overhangs or extends to one side of the brake beam to which it is secured. Hence, any increase in the size and therefore the weight of the brake cylinder increases both the bending and torsional stresses in the brake beam to which it is secured. Since the torsional stresses in the brake beam are proportional to the overhang or length of the brake cylinder, it is desirable that the overhang of the brake cylinder be minimized. If a slack adjuster mechanism is provided for the brake cylinder, it is possible to employ a shorter length brake cylinder compared to that required where a slack adjuster mechanism is not employed, for the reason that the slack adjuster mechanism prevents the piston travel from exceeding a certain maximum as the brake shoes wear away.

In installations where the type of brake rigging described above is used with cast iron brake shoes on railway cars, light or heavy, the problem of brake beam stresses is further aggravated as a result of the larger diameter brake cylinders which are required to provide the larger braking forces necessary because of the lower friction coefficient of cast iron shoes. Therefore, a slack adjusting mechanism is especially desirable where cast iron brake shoes are used with the above-described type of brake rigging since it enables the use of a shorter and therefore, lighter brake cylinder than would be required if no slack adjusting mechanism were used.

Accordingly, it is the general purpose of this invention to provide a brake rigging of the type described above that has a slack adjusting mechanism operable upon the travel of the brake cylinder piston and the piston rod, lever and link connected thereto with respect to a fixed part of the brake cylinder exceeding a chosen value.

SUMMARY OF THE INVENTION

According to the present invention, a brake rigging includes two parallel spaced-apart brake beams, one of which carries a brake cylinder device substantially at one side of the point midway its length, the piston rod of which cylinder device is operatively connected to one end of a force equalizing lever that is pivotally mounted midway its ends on the end of a non-rotatable screw member that has a non-self-locking type of external screw thread. A link is pivotally connected at one end to the other end of the equalizing lever and at its opposite end to the one brake beam at the other side of the point midway its ends at a location substantially the same distance from this midpoint as is the brake cylinder device carried by this one brake beam. There is provided for this brake rigging an automatically operative clutch-dog-type slack adjuster mechanism that comprises a housing through which the link extends there being within the housing a plurality of annular clutch dogs disposed about the above-mentioned link and normally spring-biased into locking engagement therewith. Each end of a lever pivotally mounted on the housing is provided with a yoke. One yoke is disposed against one side of a collar that is integral with a nut member the other side of which collar constitutes a clutch face. This nut member has an internal non-self-locking screw thread that engages the external screw thread on the screw member. The yoke at the other end of the lever is disposed about the link and in contact with one end of an annular lock washer or clutch dog positioner that is also disposed about the link, the other end of this clutch dog positioner being beveled. This clutch dog positioner is so interposed between this other yoke and one side of the clutch dogs that its inclined end abuts the one side of the clutch dogs, and is connected by a pair of diametrically arranged pins to the legs of a U-shaped spring retainer having an aperture in its bottom through which the link extends.

The clutch dogs are disposed between the legs of the U-shaped spring retainer and are interposed between the clutch dog positioned and an annular clutch dog follower having a slanted or beveled end abutting the other side of these clutch dogs. This follower is also disposed about the link so that its inclined end is biased against one side of the clutch dogs by a spring that is also disposed about this link and interposed between the other end of this clutch dog follower and the apertured bottom of the U-shaped spring retainer.

Upon the longitudinal movement of the link exceeding a chosen amount as the result of the wearing away of the brake shoes carried by the brake beams while a brake application is in effect, the clutch dogs are moved into contact with a stop and thereafter rocked thereby out of locking engagement with the link so that as the brake shoes continue to wear away the link is moved relative to the clutch dogs. When the brake application is subsequently released, the link is moved in the opposite direction, whereupon the spring, via the clutch dog follower and positioner, rock the clutch dogs into locking engagement with the link. The continued movement of the link toward its release position is effective via the clutch dogs and clutch dog positioner to rock the pivoted lever in the direction to decrease the force exerted on the clutch face to press it against a corresponding clutch face on the housing. Upon thus decreasing the force pressing these clutch faces into engagement, the force now exerted on the non-rotatable screw member by a brake cylinder release spring via the piston rod and the force equalizing lever acts in the direction to cause the nut member to spin on this screw member in the direction to move this screw member and the fulcrum for the equalizing lever which is pivoted thereon in the direction to compensate for the wear of the brake shoes and thus maintain a constant brake shoe clearance between the brake shoes and the tread surface of the corresponding car wheels while the brakes are released.

In the accompanying drawings:

FIG. 2 is an elevational view showing how a slack adjuster mechanism is resiliently carried by one of the brake beams shown in FIG. 1, an end cover of the slack adjuster mechanism being removed to show certain details of construction.

FIG. 3 is a cross-sectional view, taken along the line 3—3 of FIG. 2, and looking in the direction of the arrows, showing certain details of construction of the slack adjuster mechanism not made apparent in FIG. 2.

FIG. 4 is a cross-sectional view, taken along the line 4—4 of FIG. 3, and looking in the direction of the arrows, showing additional structural details of the slack adjuster mechanism.

Figure 1:
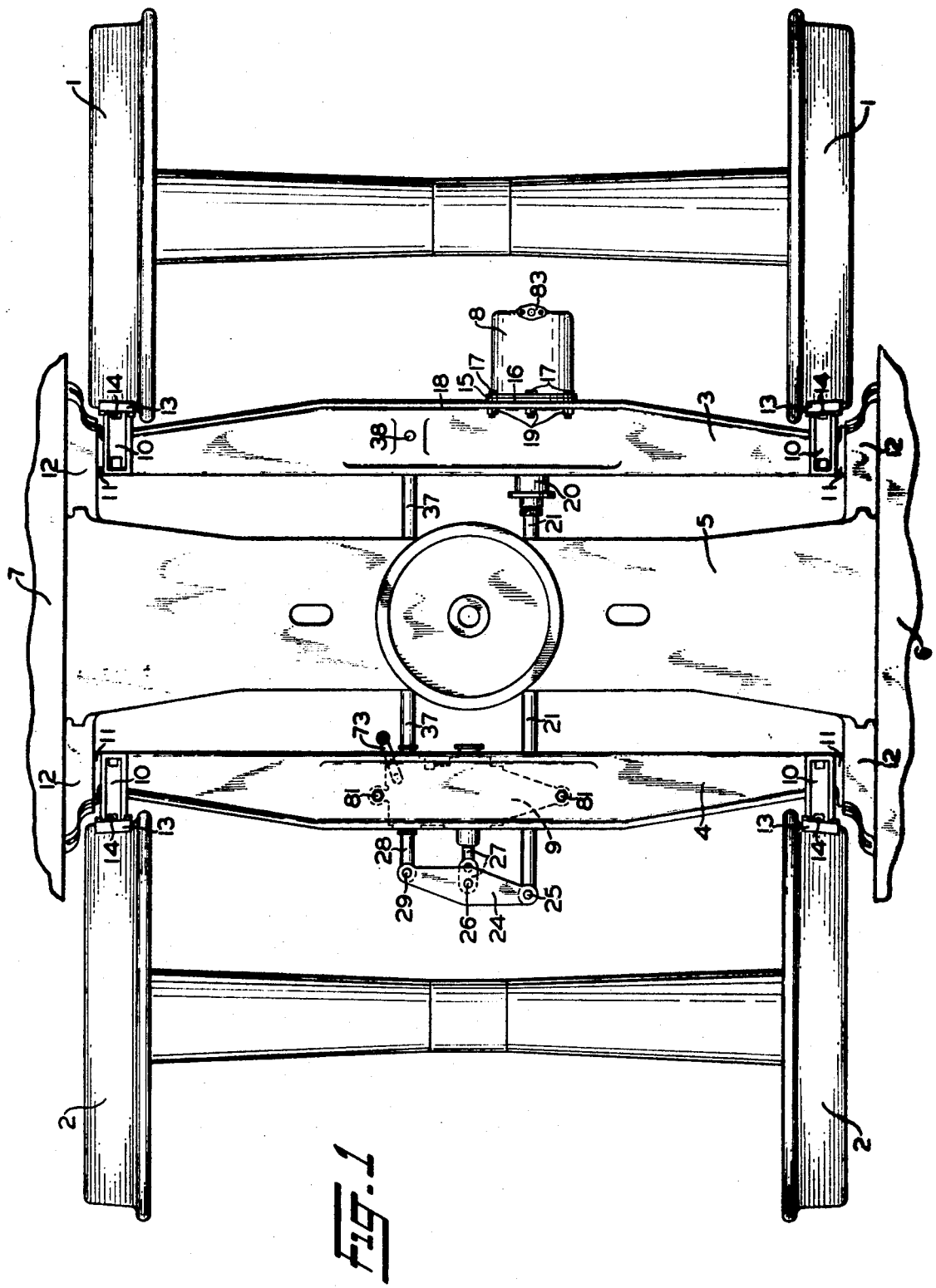
FIG. 1 is a plan view, in outline, of a brake rigging for a two-axle for-wheel car truck, embodying the invention.

Referring to FIG. 1 of the drawings, the reference numerals 1 and 2 designate respectively wheels secured at opposite ends of each of two axles of a two-axle four-wheel railway car truck.

The brake rigging shown in the drawings comprises two cast brake beams 3 and 4 which brake beams extend crosswise of the car truck and in parallel spaced relation to each other and to a truck bolster 5. The brake beams 3 and 4 are symmetrically arranged on opposite sides of the truck bolster 5 and are movably supported at each end on the side frame members 6 and 7 in the manner hereinafter described.

The brake beams 3 and 4 each have the shape of a standard channel, such as a U-channel. The brake beam 3 is constructed to provide a support for a brake cylinder device 8 and the brake beam 4 is constructed to provide a support for a slack adjuster mechanism 9, as hereinafter described.

A brake head 10 is riveted or otherwise attached to each end of the brake beams 3 and 4 adjacent to and on the inboard side of a guide foot 11. Each foot 11 is a flat L-shaped metal member, one leg of which extends between the flanges of the brake beam and is suitably secured thereto. The other leg of this guide foot 11 is slidably supported in a grooved wear plate and guide member 12, this wear plate and guide member being secured to the corresponding one of the truck side frame members 6 and 7. The wear plate and guide members and the guide feet serve to support the brake beams 3 and 4 at the proper height above the rails, (that is, somewhat below the horizontal diameter of the wheels) the groove in the wear plate and guide member 12 being at a slight angle to the horizontal to permit bodily movement of the brake beams in a direction radially of the associated wheels when a brake application is made.

Each brake head 10 carries a composition brake shoe 13 for contact with the tread surface of an associated wheel. In customary manner the shoe 13 has a backing plate provided with a key bridge to receive a key 14 for removably locking the shoe 13 to the brake head 10.

The brake shoes 13 are operated into and out of contact with their associated wheels 1, 2 by means of the brake cylinder device 8.

In order to secure the brake cylinder device 8 to the brake beam 3, the web of a cast U-shaped channel constituting this brake beam has formed integral therewith substantially at one side of the point midway its length a circular opening (not shown). The outer end of the respective upper and lower flanges of the brake beam 3 adjacent this opening is provided with an inturned flange (not shown) which two inturned flanges form a circular opening substantially the same diameter as the outside diameter of a cup-shaped body of the brake cylinder 8. This body is provided intermediate its ends with an outturned flange 15 between which and the inturned flange formed by the portion of the web surrounding the circular opening therein is disposed a gasket 16 constructed of any suitable resilient material. The outturned flange 15 and the gasket 16 are provided with a plurality of arcuately spaced smooth bores (not shown) through which extend a plurality of bolts 17 that also extend through corresponding smooth bores (not shown) provided in an upper flange 18 and a lower flange (not shown) that are cast integral with the brake beam 3. A nut 19 is secured to the end of each bolt 17 and tightened against the corresponding one of the above-mentioned flanges to securely clamp the gasket 16 between these flanges on the brake beam 3 and the flange 15 on the body of brake cylinder device 8.

The inturned flange formed by the circular opening in the web of the brake beam 3 constitutes a non-pressure head for the brake cylinder device 8. This circular opening in the web of the brake beam 3 has a hollow rod 20 extending therethrough, the right-hand end of which is secured to or integral with a piston (not shown) that is slidably mounted in the cup-shaped body of the brake cylinder device 8. The hollow rod 20 is provided with internal screw threads that have screw-threaded engagement with external screw threads on a push rod 21.

The push rod 21 extends through a window (not shown) in the bolster 5. As shown in FIG. 1 of the drawings, the push rod 21 occupies a substantially horizontal position and also extends through a window (not shown) in the brake beam 4 and a window 22 (FIG. 2) provided therefor in a body casting 23 of the slack adjuster mechanism 9. The left-hand end, as viewed in FIG. 1, of the rod 21 is disposed between the lower end of an equalizing lever 24 that comprises two identical parallel spaced-apart members and connected thereto by any suitable means, such as, for example, a headed pin 25 and a cotter pin (not shown).

Substantially midway the ends thereof, each of the spaced-apart members comprising the lever 24 is provided with a bore through which extends a headed pin 26 that also extends through one of a pair of coaxial bores provided adjacent the left-hand end, as viewed in FIG. 1, of a non-rotatable slack adjuster screw 27 hereinafter described. The other end of the two members comprising the lever 24 has disposed therebetween the left-hand end of a link 28 which is pivotally connected to these members as by a headed pin 29 and a cotter pin (not shown), it being understood that the pin 26 is provided adjacent its lower end with a cotter pin (not shown).

As shown in FIG. 1, the link 28 occupies a substantially horizontal position in spaced-apart parallel relation to the push rod 21 and extends through a window 30 (FIG. 3) in the slack adjuster body casting 23, a coaxial window 31 in a cover member 32 that is secured to the open end of body casting 23 by a plurality of cap screws 33, two of which appear in FIG. 3, and a seal member 34 hereinafter described.

The right-hand end of the link 28 is provided with a screw-threaded borromed bore 35 (FIG. 3) in which is received the screw-threaded left-hand end 36 of a link 37 that extends through a coaxial window (not shown) in the bolster 5. The right-hand end of the link 37, as viewed in FIG. 1, is operatively connected to the brake beam 3 as by means such as, for example, a headed pin 38 and a cotter pin (not shown).

As shown in FIG. 3 of the drawings, the abovementioned seal member 34 comprises an annular resilient seal 39 that surrounds the link 28 in sealing relation therewith and is disposed in a groove provided therefor in a metallic ring 40 that in turn is surrounded by an annular resilient ring 41 the thickness of which is slightly greater than that of the metallic ring 40 in order that the ring 41 form a seal with the cover member 32 when an annular cup-shaped member 42 in which the rings 40 and 41 are disposed is secured to the bottom, as viewed in FIG. 3, of the cover member 32 by any suitable means (not shown). Thus, the resilient seal 39 and resilient ring 41 prevent the entrance of contaminants into the interior of the slack adjuster body casting 23 via the window 31 in the cover member 32.

The slack adjuster mechanism 9 comprises, in addition to the body casting 23 and the slack adjuster screw 27 which is provided with a non-self-locking type external screw thread, a nut member 43 having a non-self-locking internal screw thread whereby this nut member is rotatably mounted on the non-rotatable screw 27.

As shown in FIG. 3, the nut member 43 is provided intermediate its ends with a collar 44 which constitutes a clutch element the face of which, while the parts of the slack adjuster mechanism 9 occupies the position shown in the drawings, has clutching contact with a stationary clutch face 45 formed on the body casting 23. In order to normally bias the collar 44 against the clutch face 45, the nut member 43 is provided on the lower side of the collar with a peripheral annular groove in which is disposed a snap ring 46 that supports a spring seat 47 on which rests a washer 48 between which and the collar 44 is disposed a yoke 49 formed at one end of a lever 50 hereinafter described. Interposed between a washer 51 that abuts the lower side of the spring seat 47 and a slack adjuster nut housing flange 52 that is secured to four bosses 53 (FIG. 2) integral with the interior wall of the body casting 23 by four cap screws 54, is a spring 55 (FIG. 3) that is effective via the washer 51, spring seat 47, washer 48 and yoke 49 to normally bias the clutch face on the collar 44 into frictional clutching contact with the stationary clutch face 45 on the body casting 23.

The above-mentioned lever 50 is pivotally mounted intermediate its ends on a pin 56 the opposite ends of which are anchored in the jaws of a clevis 57 formed at one end of an arm 58 that is integral with the slack adjuster nut housing flange 52. The other end of the lever 50 is provided with a yoke 59 that is disposed about the link 28, as shown in FIGS. 3 and 4, above a lock washer positioner 60 through which the link 28 extends.

The positioner 60 is in the form of a sleeve, one end of which is provided with a boss 61 and the other end of which is beveled. Intermediate its ends, the positioner 60 has a lost-motion connection with the upper end of a U-shaped spring seat or retainer 62 by means of a pair of headed pins 63 that extend through elongated slots in the legs of retainer 62 and have their ends press-fitted into bottomed bores provided therefor in positioner 60, as best shown in FIG. 4, it being noted that the link 28 extends through a bore 64 in the bottom of this spring retainer 62.

As shown in FIG. 3, a plurality of lock washers or clutch dogs 65 are disposed about the link 28, the uppermost dog abutting the beveled end of the positioner 60. These clutch dogs 65 are rectangular in shape and are provided with a bore, the diameter of which slightly exceeds the diameter of the link 28. A lock washer follower 66 which is in the form of a sleeve is disposed about the link 28 and is provided with a bevel at one end which is normally biased against the lowermost clutch dog 65 by a spring 67 which is also disposed about the link 28 and interposed between the other end of this sleeve 66 and the bottom of spring retainer 62. The angle of the bevel on the beveled ends of the positioner 60 and the follower 66, and the diameter of the link 28 and the bore in the clutch dogs 65 are such that these clutch dogs are normally gripped or locked against the periphery of the link 28 by the force of spring 67.

In order to effect unlocking of the clutch dogs 65 from the periphery of the link 28 when this link has been moved downward, as viewed in FIG. 3, more than a chosen distance, which distance is that necessary to bring the brake shoes 13 into braking contact with the tread surfaces of the wheels 1, 2, a stop member 68 is formed integral with the slack adjuster nut housing 52 and extends therefrom into the path of these clutch dogs 65.

In order to unlock the clutch dogs 65 from the link 28 to adjust the brake rigging to provide proper brake shoe clearance when replacing worn out brake shoes with new brake shoes, a manual release mechanism is provided which will now be described. As shown in FIG. 2, disposed within the body casting 23 is a manual release lever 69 to the left-hand end of the lower side of which is secured, as by welding, a lever projection 70 that is adapted to be moved into contact with the lower, as viewed in FIG. 3, clutch dog 65 when this lever 69 is rotated in the direction to move this projection 70 toward the clutch dogs 65. Secured to the right-hand end of the lever 69, as viewed in FIG. 2, is a lever hub 71 that extends through a bore 72 provided therefor in the wall of the body casting 23. This hub 71 receives thereon exterior of the casting 23 a handle or manual release lever 73 which is secured thereto by any suitable means (not shown).

As shown in FIGS. 2 and 3, the body casting 23 of the slack adjuster mechanism 9 is provided with a pair of oppositely extending arms 74 and 75 each of which is provided with a bore 76. Disposed in each bore 76 is a resilient bushing 77 which may be formed of, for example, hard rubber. Disposed in each of these resilient bushings 77 is a metallic bushing 78. When the body casting 23 is placed between the upper and lower flanges of the brake beam 4, the bushings 77 and 78 are disposed between upper and lower bosses 79 and 80 that are formed integral with the beam 4 and provided with bores coaxial with these bushings for receiving bolts 81, the lower end of each of which is adapted to receive a nut 82 whereby these bolts 81 and nuts 82 rigidly secured the slack adjuster mechanism 9 to the brake beam 4.

In operation, when it is desired to effect a brake application, fluid under pressure is admitted via a pipe connection 83 (FIG. 1) to a piston chamber (not shown) formed in the brake cylinder device 8 between the end of the brake cylinder body and the piston slidably mounted therein, by operation of the brake control valve device of the usual air brake system on railway cars under the control of the operator.

Fluid under pressure thus supplied to the above-mentioned chamber in the brake cylinder device 8 is effective to move the piston therein and the brake cylinder body in opposite directions. As this piston and body are moved in opposite directions, the body transmits a force to the brake beam 3 which acts in the direction of the right hand, as viewed in FIG. 1.

Simultaneously, the piston transmits a force to the lever 24 via the hollow rod 20, push rod 21 and pin 25 which force is effective to rock the lever 24 clockwise, as viewed in FIG. 1, about the pin 26 carried by the left-hand end of the slack adjuster screw 27, it being noted that the lever 24 is mounted on the pin 26 midway the ends of this lever.

The clockwise rocking of the lever 24 about the pin 26 is effective to transmit a force to the links 28 and 37, which constitute a single link, via the pin 29. Since the lever 24 is mounted on the pin 26 midway the ends thereof, it is apparent that the force transmitted to the links 28 and 37 by the lever 24 is equal in magnitude to the force transmitted to the lever 24 by the push rod 21. Furthermore, it is apparent from FIG. 1 of the drawings, that the force thus transmitted to the links 28 and 37 acts in a direction opposite the direction of the force transmitted to the push rod 21 by the piston of the brake cylinder device 8. The force thus transmitted to the links 28 and 37 is in turn transmitted to the brake beam 3 via the pin 38.

As can be seen from FIG. 1, the location of the center line of the pin 38 is the same distance on one side of the point midway the ends of the brake beam 3 as in the location of the longitudinal center line of the brake cylinder device 8 on the other side of this point midway the end of the brake beam 3. Accordingly, it is apparent that the brake beam 3 is acted upon by two equal forces acting in the same direction on opposite sides of the point midway the ends of this beam 3 at equal distances from this point. Therefore, it will be understood that these two equal forces acting on the brake beam 3 will move it in the direction of the right-hand, as viewed in FIG. 1 of the drawings, until the brake shoes 13 carried by this beam are brought into braking contact with the tread surfaces of the wheels 1 of the truck which prevents further movement of the brake beam 3 in the direction of the right hand.

Subsequent to movement of the brake shoes 13 carried by the brake beam 3 into braking contact with the tread surfaces of the wheels 1, the links 28 and 37 cannot move further in the direction of the right hand, as viewed in FIG. 1. Accordingly, it will be apparent that the pin 29 becomes a fixed fulcrum for the lever 24. Therefore, the force now transmitted to the lever 24 from the piston of the brake cylinder device 8, via the hollow rod 20, push rod 21 and pin 25, becomes effective to rock this lever 24 clockwise, as viewed in FIG. 1, about the pin 29.

It is apparent from FIG. 1 that the center line of the pin 26 carried by the slack adjuster screw 27 passes through the longitudinal center line of the truck which center line passes through the point midway the ends of the brake beam 4.

Since the lever 24 is pivotally mounted on the pin 26 midway the length of this lever 24, it is apparent that the force transmitted to the pin 26 by the lever 24 is twice the force transmitted to the pin 25 by the piston of the brake cylinder device 8 via the hollow rod 20 and push rod 21. Accordingly, it will be understood that the brake beam 4 now will be moved in the direction of the left hand, as viewed in FIG. 1, by a force transmitted thereto by the pin 26 via the slack adjuster screw 27 and the slack adjuster mechanism 9, and that the magnitude of this force is equal to the sum of the two above-described forces acting on the brake beam 3 to move it in the direction of the right hand, as viewed in FIG. 1. Therefore, the brake beam 4 will be moved in the direction of the left hand until the brake shoes 13 carried by this beam are brought into braking contact with the tread surface of the wheels 2 of the truck which prevents further movement of the brake beam 4 in the direction of the left hand.

As the brake beams 3 and 4 are moved, as described above, these beams are supported and guided by the guide feet 11 as each of these feet has sliding contact in a corresponding groove in the respective wear plate and guide member 12. As hereinbefore-mentioned, the orientation of the wear plates and guide members 12 is such that the brake beams 3 and 4 and the brake shoes 13 carried thereby are moved substantially radially toward the wheels.

It will be understood that, in view of the symmetrical disposition of the brake beams 3 and 4 on the opposite sides of the truck bolster 5, and since the area of the piston and the cup-shaped end of the body of the brake cylinder device 8 are the same, the fluid under pressure now being supplied to the chamber therebetween produces substantially equalized forces of application of all the brake shoes on the wheels of the car truck.

It should be understood that, in the absence of wear of the brake shoes 13, when the above-described brake application is effected, the lower clutch dog 65 shown in FIG. 3 is brought into contact with the stop member 68 substantially at the same time as the brake shoes 13 are brought into contact with the tread surface of the corresponding wheels. Consequently, so long as no brake shoe wear occurs, the clutch dogs or lock washers 15 are not rocked or moved from the inclined position in which they are shown in FIG. 3, or, in other words, they remain in locking engagement with the link 28 so that these clutch dogs or lock washers are not effective via the lock washer positioner 60 and boss 61 thereon to rock lever 50 counterclockwise about pin 56 when effecting a brake release.

When it is desired to release the brake application, the fluid under pressure previously supplied to the chamber in the brake cylinder device 8 is vented in the usual manner through operation of the brake control valve device of the car brake system under the control of the operator, whereupon the force of a release spring (not shown) interposed between the piston and non-pressure head of the brake cylinder device 8, moves the piston and the body of this brake cylinder device in a brake releasing direction to move the brake beams toward each other and the brake shoes carried thereby away from the tread surface of the wheels to a normal clearance position with respect to the tread surface of the wheels to effect a brake release.

Due to the inclination of the grooves in the wear plate and guide members 12, the brake beams 3 and 4 tend to return by action of gravity to their normal symmetrical relation with respect to the truck bolster 5, in which position the clearance between the brake shoes on one brake beam and their associated wheels is substantially equal to the clearance between the brake shoes on the other brake beam and their associated wheels.

Now, let it be supposed that while the brakes are applied, the brake shoes 13 begin to wear away. As hereinbefore stated, in the absence of wear of the brake shoes 13, the lower clutch dog 65 shown in FIG. 3 is brought into contact with the stop member 68 substantially at the same time as the brake shoes 13 and brought into contact with the tread surface of the corresponding wheels.

It is apparent from FIG. 1 that as the brake shoes 13 carried by the brake beam 3 wear away, this beam 3 must be moved in the direction of the right hand, in order to maintain these brake shoes in braking contact with the tread surface of the wheels 1. Likewise, as the brake shoes 13 carried by the brake beam 4 wear away, this beam 4 must be moved in the direction of the left hand in order to maintain these brake shoes in braking contact with the tread surface of the wheels 2.

As the brake shoes 13 carried by the brake beam 3 wear away, the fluid under pressure acting on the right-hand end of the body of the brake cylinder device 8 transmits a force to the brake beam 3 which acts in the direction of the right hand, as viewed in FIG. 1, and the fluid under pressure acting on the piston in the brake cylinder device 8 transmits an equal force to the link 28, 37 via the hollow rod 20, push rod 21, pins 25 and 29 and lever 24.

Since the lower clutch dog 65 abuts the stop 68 prior to any brake shoe wear, it is apparent from FIGS. 1 and 3 that as the brake shoes 13 carried by the brake beam 3 wear away, the link 28 must move relative to the several clutch dogs 15 in order to transmit a force through the link 37 and pin 38 to the brake beam 3 which, together with the force transmitted to this brake beam 3 by the body of the brake cylinder device 8, as mentioned above, moves this brake beam 3 in the direction of the right hand to maintain the brake shoes carried thereby in braking contact with the tread surface of the wheels 1. It is apparent from FIGS. 3 and 4 that, since the clutch dogs or lock washers 15 occupy an inclined position and the spring 67 biases the beveled upper end of lock washer follower 66 against the lower washer 15, and, likewise, the upper lock washer 15 against the beveled lower end of lock washer positioner 60, this construction provides for downward movement, as viewed in FIG. 3, of the link 28 relative to the clutch dogs 15 and the brake beam 4 since these clutch dogs 15 are prevented from moving downward by the stop member 68. Thus, the link 28 is moved downward relative to the brake beam 4 and the clutch dogs 15 a distance corresponding to the amount of wear of the brake shoes 13 occurring while a brake application is in effect.

If the brake shoes 13 carried by the brake beam 4 wear away while a brake application is in effect, the pin 29 will act as a fulcrum for the lever 24 so that the fluid under pressure acting on the piston of the brake cylinder device 8 is effective via the hollow rod 20 and push rod 21 to rotate this lever 24 clockwise, as viewed in FIG. 1, about the pin 29 to exert a pull on the slack adjuster screw 27 via the pin 26. This pull on the screw 27 is transmitted through the slack adjuster mechanism 9 to the brake beam 4 to move this beam in the direction of the left hand and thereby maintain the brake shoes 13 carried by this beam 4 in braking contact with the tread surface of the wheels 2 as these shoes wear away.

When it is desired to release the brake application, subsequent to wearing away of the brake shoes 13 and movement of the link 28 relative to the clutch dogs 65 and the brake beam 4 in the manner described above, fluid under pressure supplied to the piston chamber in the brake cylinder device 8 is vented in the usual manner through the pipe connection 83 to the brake control valve device and thence to atmosphere. Upon thus venting fluid under pressure from the piston chamber of the brake cylinder device 8, the force of the release spring (not shown) acting on the non-pressure head of this brake cylinder device moves the brake cylinder body and the brake cylinder piston in a brake releasing direction to move the brake beams toward each other and the brake shoes correspondingly away from the tread surface of the wheels of the truck to effect a brake release.

This movement of the brake cylinder piston is effective via hollow rod 20, push rod 21 and pin 25 to rock the lever 24 counterclockwise about the pin 26, as viewed in FIGS. 1 and 3. This counterclockwise rocking of the lever 24 about the pin 26 is effective to move the links 28 and 37 upward, as viewed in FIG. 3.

As the link 28 is moved upward, the spring 67 (FIG. 4) is rendered effective via the lock washer follower 66, which has a beveled upper end, to tilt the lock washer or clutch dogs 65 thus causing them to bind or bite the periphery of the link 28, it being noted that the lower end of the lock washer positioner 60 is also provided with a beveled lower end against which the upper washer 65 is forced by the spring 67. Consequently, as the link 28 is moved upward, the spring 67 causes the clutch dogs 65 to bite into the periphery of this link at a location that is above the location at which these clutch dogs previously were locked to this link 28. Subsequent to this locking of the clutch dogs 65 to the link 28, further upward movement of this link 28 moves these clutch dogs 65 upward and away from stop members 68.

As the link 28, lock washer follower 66, clutch dogs 65 and lock washer positioner 60 are moved upward, as viewed in FIG. 3, the lever 24 rocks counterclockwise about pin 26 and the push rod 21 moves downward in a normal manner until the boss 61 formed integral with the positioner 60 is moved into abutting contact with the yoke 59 of the lever 50. Further upward movement of the link 28 and lock washer positioner 60 is effective to rock lever 50 counterclockwise about the pin 56 until the yoke 59 abuts the body casting 23. This prevents further upward movement of the link 28, positioner 60, clutch dogs 65 and lock washer follower 66. Since the link 28 was moved relative to the clutch dogs or washers 65 as the brake shoes wore away while the brake application was in effect, yoke 59 of lever 50 strikes the body casting 23 before the link 28, lever 24, push rod 21, hollow rod 20 and the piston of the brake cylinder 8 reach the release position they occupied prior to effecting the brake application.

As the lever 50 is thus rocked counterclockwise, as viewed in FIG. 3, about the pin 56, the yoke 49 on the left-hand end of this lever transmits a force to the nut member 43 via the washer 48, spring seat 47 and snap ring 46 that acts in a downward direction so that the clutch face on the collar 44 that is integral with the nut member 43 is no longer pressed against the clutch face 45 formed on the body casting 23. With the force thus removed from the clutch face on the collar 44, the nut member 43 is rendered free to "spin" on the slack adjuster screw 27.

Referring to FIGS. 1 and 3, it will be noted that at this time the release spring in the brake cylinder device 8 is exerting a force on the brake cylinder piston which force is transmitted through this piston and the hollow rod 20 to the push rod 21. As viewed in FIG. 3, this force on the push rod 21 acts in a downward direction and is transmitted through the pin 25 to the lever 24 to rock this lever 24 counterclockwise about the pin 29. Consequently, the force acting through the pin 25 in the direction to rock the lever 24 counterclockwise about the pin 29 causes the pin 26 to transmit a force to slack adjuster screw 27 that acts in a downward direction, as viewed in FIG. 3. Since the distance between the pins 25 and 29 is twice the distance between the pins 26 and 29, the force transmitted to the slack adjuster screw 27 is twice the magnitude of the force exerted on the push rod 21 by the brake cylinder release spring via the brake cylinder piston and hollow rod 20. It being remembered that the collar 44 is no longer pressed against the clutch face 45 by the yoke 49 of lever 50, as explained above, the force transmitted to the slack adjuster screw 27 in the manner just explained will cause downward movement, as viewed in FIG. 3 of this screw 27. Therefore, the nut member 43 is subject to a force that acts in a downward direction and the slack adjuster screw 27 is subject to a force that acts in a downward direction. Consequently, the slack adjuster screw 27 and the nut member 43 will be moved downward simultaneously without the nut member 43 spinning on the screw 27 until the lever 50 is rocked counterclockwise about the pin 56 far enough for the yoke 59 to be moved into abutting relationship with the body casting 23.

Subsequent to the yoke 59 moving into abutting relationship with the body casting 23, the lever 50 no longer transmits a force to the nut member 43. However, the clutch face on the collar 44 is not pressed against the clutch face 45 on the body casting 23 and the brake cylinder release spring is still transmitting a force to the push rod 21 which in turn, in the manner hereinbefore described, causes the slack adjuster screw 27 to be subject to a force that acts in the direction to move this screw downward, as viewed in FIG. 3. Therefore, as the slack adjuster screw 27 is moved downward by the downwardly acting force transmitted to the push rod 21 from the brake cylinder release spring via the brake cylinder piston and hollow rod 20, the nut member 43 will "spin" on this screw 27. This downward movement of the slack adjuster screw 27 and "spinning" of the nut member 43 thereon will continue until the brake cylinder piston is moved to its brake release position by the brake cylinder release spring, it being understood that in its brake release position, this piston abuts a stop so that the brake cylinder release spring is no longer effective to transmit a force to the push rod 21 via this piston and hollow rod 20. Consequently, substantially at the same time as the brake cylinder piston reaches its release position so that the push rod 21 is no longer moved downward, as viewed in FIG. 3, the "spinning" of the nut member 43 on the slack adjuster screw 27 will be terminated. Upon termination of the "spinning" of the nut member 43 on the slack adjuster screw 27, the spring 55 is rendered effective via the washer 51, spring seat 47 and washer 48 to transmit a force to the nut member 43 which acts in an upward direction to tend to "spin" the nut member 43 on the slack adjuster screw 27 and force the clutch face on the collar 44 into clutching contact with the clutch face 45 on the body casting 23.

From the foregoing, it is apparent that as the brake shoes 13 wear away while a brake application is in effect, the link 28 is moved relative to the clutch dogs 65 and the brake beams 3 and 4 are moved in opposite directions and away from each other to maintain the brake shoes carried by each beam in braking contact with the tread surface of the corresponding wheels. Thereafter, upon effecting a brake release, the clutch dogs 65 are relocked to the link 28 and then, as the link 28 moves towards its brake release position, are effective, via the lock washer positioned 60, to rock the lever 50 counterclockwise to relieve the force pressing the clutch face on on collar 44 against the clutch face 45 on the body casting 23 thereby enabling "spinning" of the nut member 43 and downward movement, as viewed in FIG. 3, of the slack adjuster screw 27 relative to the brake beam 4 by the force transmitted to this screw 27 from the brake cylinder release spring via the brake cylinder piston, hollow rod 20, push rod 21, pin 25, lever 24, and pin 26 until the brake cylinder piston is moved to its release position by the release spring. The position of the brake beams 3 and 4 and the configuration of the operating linkage for these beams is now such that, upon effecting a subsequent brake application, the brake shoes 13 carried by the brake beams 3 and 4 will be brought into braking contact with the tread surface of the corresponding wheels substantially at the same time as the clutch dogs 65 are moved into contact with the stop member 68. Should the brake shoes 13 wear while this brake application is in effect, this wear, upon effecting a subsequent brake release, will be compensated for in the manner hereinbefore explained.

When the brake shoes 13 have completely worn out and are to be replaced with new shoes, it is necessary to return the members of the operating linkage and the brake beams 3 and 4 to their original positions since the thickness of the new brake shoes is greater than that of the worn shoes. The members of this linkage and the brake beams can be manually moved to their original positions subsequent to unlocking the clutch dogs 65 from the link 28. To unlock the clutch dogs 65 from the link 28, the handle 73 (FIG. 2) is manually rotated in the direction to cause the manual release lever 69 to be rocked in the direction to move the lever projection 70 on the end of this lever 69 into contact with the lefthand end, as viewed in FIG. 3, of the lower clutch dog 65. Continued rocking in the same direction of the release lever 69 will cause the lever projection 70 thereon to move the clutch dogs 65 out of biting or gripping contact with the periphery of the link 28.

Subsequent to this unlocking the clutch dogs 65 from the periphery of the link 28, the rocking of the manual release lever 69 will be continued until these clutch dogs 65 effect, via the lock washer positioner 60 and boss 61 thereon, counterclockwise rocking of the lever 50 about the pin 56 until the yoke 59 is moved into contact with the body casting 23. This counterclockwise rocking of the lever 50 removes the force pressing the clutch face on the collar 44 against the clutch face 45 on the body casting 23 in the manner hereinbefore explained. The slack adjuster screw 27 can now be moved upward, as viewed in FIG. 3, in response to a manual force applied thereto, it being understood that the nut member 43 will "spin" thereon to permit this upward movement of the screw 27 to its original position.

When the brake beams and all the parts of the operating linkage therefor are moved to their original position, the manual release lever 69 (FIG. 2) can be released. The spring 67 (FIG. 4) will then, via the lock washer follower 66, cause the clutch dogs or washers 65 to be relocked to the link 28.

Having now described the invention, what I claim as new and desire to secure by Letters Patent, is:

1. A slack adjusting mechanism for railway truck brake rigging of the type in which one of two substantially parallel brake beams is operatively connected respectively by means of a link and a lever to the piston rod of a piston slidably mounted in a brake cylinder carried on the other of the brake beams, wherein the improvement comprises:
   a. a slack adjuster casing carried on the one brake beam and provided with a plurality of bores and a clutch face;
   b. a slack adjuster screw extending through one of said bores in said casing and being provided with external non-self-locking screw threads,
   c. a nut member having internal non-self-locking screw threads engaging the external non-self-locking screw threads on said slack adjuster screw whereby said nut member is rotatably mounted on said screw, said nut member being provided with a clutch face for clutching contact with said clutch face on said casing to prevent rotation of said nut and longitudinal movement of said screw while said clutch faces are in clutching contact,
   d. locking means for locking engagement with said link which extends through another of said bores in said casing,
   e. lever means interposed between said nut member and said locking means for controlling engagement and disengagement of said clutch faces,
   f. means operative responsively to brake shoe wear occurring during a brake application to effect disengagement of said locking means from said link whereupon said link is movable relative to said locking means and said one brake beam, and
   g. means operative responsively to effecting a brake release, subsequent to said brake shoe wear, to effect reengagement of said locking means with said link and thereafter operation of said lever means to cause disengagement of said clutch faces thereby rendering said screw longitudinally movable responsively to movement of said link, lever and piston rod to their release position to cause rotation of said nut member on said screw whereby said link, lever and piston rod, in movement to their release position, are moved relative to said brake beams thereby compensating for wear of said brake shoes.

2. A slack adjuster mechanism for a railway truck brake rigging, as recited in claim 1, further characterized in that the axes of said bores in said casing are parallel, and said clutch face provided on said casing is disposed about one of said bores and lies in a plane forming a right angle with the axis of said one bore.

3. A slack adjuster mechanism for a railway truck brake rigging, as recited in claim 1, further characterized by means whereby said slack adjuster casing is removably secured to said one brake beam.

4. A slack adjuster mechanism for a railway truck brake rigging, as recited in claim 1, further characterized in that one end of said slack adjuster screw is pivotally connected to said lever midway the ends thereof.

5. A slack adjuster mechanism for a railway truck brake rigging, as recited in claim 1, further characterized in that adjacent one end thereof said slack adjuster screw is provided with a plurality of parallel spaced-apart bores whereby said lever is selectively pivotally mountable on said screw.

6. A slack adjuster mechanism for a railway truck brake rigging, as recited in claim 1, further characterized in that said nut member is provided with a collar on one side of which is formed said clutch face for clutching contact with said clutch face on said casing upon the application of force to the other side of said collar by said lever means.

7. A slack adjuster mechanism for a railway truck brake rigging, as recited in claim 1, further characterized in that said locking means comprises:
   a. at least one clutch dog disposed about said link,
   b. a pair of sleeve members disposed about said link and on the responsive opposite sides of said at least one clutch dog, each of said sleeve members having the end thereof adjacent said at least one clutch dog beveled and one of said sleeve members being provided with a pair of diametrically arranged bottomed bores,
   c. a U-shaped spring seat provided with a bore through which said link extends and with a pair of diametrically arranged slots, one in each leg thereof,
   d. a pair of anchor members, each extending through one of said slots in said spring seat and having one end anchored in one of said bottomed bores in said one sleeve member whereby said anchor members cooperate with said one sleeve member and said spring seat to provide a lost-motion connection therebetween, and
   e. a spring disposed about said link and interposed between said spring seat and the other of said sleeve members for normally biasing, via the beveled end of said sleeve members, said at least one clutch dog into biting locking engagement with the periphery of said link.

8. A slack adjuster mechanism for a railway truck brake rigging, as recited in claim 1, further characterized in that said lever means comprises:
   a. a lever having a yoke at each end thereof, one of said yokes being disposed about said link and in the path of movement of said locking means upon movement of said link in a brake releasing direction more than a chosen amount, and the other of said yokes being so disposed as to engage said nut member upon the rocking of said lever in one direction,
   b. a fulcrum member upon which said lever is pivotally mounted intermediate the ends thereof, and
   c. biasing means interposed between said slack adjuster casing and said other yoke for rocking said lever about said fulcrum member in the direction to press said clutch face on said nut member against said clutch face on said slack adjuster casing.

9. A slack adjuster mechanism for a railway truck brake rigging, as recited in claim 1, further characterized in that said means operative responsively to brake shoe wear to effect disengagement of said locking means comprises a stop carried by said slack adjuster casing and so disposed in the path of movement of said locking means as to be engaged thereby only upon the occurrence of brake shoe wear while a brake application is in effect.

10. A slack adjuster mechanism for a railway truck brake rigging, as recited in claim 1, further characterized in that said means operative to effect reengagement of said locking means with said link and thereafter operation of said lever means comprises:
   a. a pair of sleeve members disposed about said link and on the respective opposite sides of said locking means, each of said sleeve members having the end thereof adjacent said locking means beveled and one of said sleeve members being provided with a boss on the end thereof opposite said bevel for engagement with said lever means and with a pair of diametrically arranged bottomed bores,
   b. a U-shaped spring seat provided with a bore through which said link extends and with a pair of diametrically arranged slots, one in each leg thereof,
   c. a pair of anchor members, each extending through one of said slots in said spring seat and having one end anchored in one of said bottomed bores in said one sleeve member whereby said anchor members cooperate with said one sleeve member and said spring seat to provide a lost-motion connection therebetween, and
   d. a spring disposed about said link and interposed between said spring seat and the other of said sleeve members for normally biasing, via the beveled end of said sleeve members, said locking means into locking engagement with the periphery of said link, said spring being effective, upon movement of said link in a brake releasing direction subsequent to disengagement of said locking means with the periphery of said link in response to brake shoe wear occurring while a brake application was in effect, via said sleeve members, to cause reengagement of said locking means with the periphery of said link.

11. A slack adjuster mechanism for a railway truck brake rigging, as recited in claim 6, further characterized by a second means for effecting the application of force to said nut member to press said clutch face on said collar against said clutch face on said casing independently of said lever means.

12. A slack adjuster mechanism for a railway truck brake rigging, as recited in claim 7, further characterized in that said at least one clutch dog comprises a thin rectangular washer having a central bore therein, the diameter of which is substantially the same as the diameter of said link.

* * * * *